US011196843B2

(12) United States Patent
Punadikar et al.

(10) Patent No.: US 11,196,843 B2
(45) Date of Patent: Dec. 7, 2021

(54) APPLICATION DATA ACCESS PRIORITY FOR REMOTE STORAGE SYSTEMS

(71) Applicant: International Business Machines Corporation, Armonk, NY (US)

(72) Inventors: Sachin C. Punadikar, Pune (IN); Sandeep R. Patil, Pune (IN); Pravin A. Junnarkar, Pune (IN); Sudhir Alluri, Bangalore (IN); Malahal Naineni, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 16/121,399

(22) Filed: Sep. 4, 2018

(65) Prior Publication Data
US 2020/0076922 A1 Mar. 5, 2020

(51) Int. Cl.
*H04L 29/06* (2006.01)
*H04L 29/08* (2006.01)

(52) U.S. Cl.
CPC .......... *H04L 67/40* (2013.01); *H04L 67/1097* (2013.01); *H04L 67/32* (2013.01); *H04L 67/42* (2013.01)

(58) Field of Classification Search
CPC ....... H04L 67/14; H04L 1/1887; H04L 49/90; H04L 47/50; H04L 47/6285; H04L 47/30; H04L 47/6275; H04L 49/9005; H04L 47/6215; H04L 63/1408; H04L 67/40; H04L 67/42; H04L 51/26; H04L 47/2441; H04L 47/622; G06F 9/547; G06F 9/5005; G06F 13/385; G06F 3/0659; G06F 3/1213; G06F 3/1218; G06F 2209/548;
(Continued)

(56) References Cited

U.S. PATENT DOCUMENTS 4,679,190 A * 7/1987 Dias ................. H04Q 11/04
370/355
5,905,877 A * 5/1999 Guthrie ................ G06F 13/362
710/112
(Continued)

FOREIGN PATENT DOCUMENTS

CN 104243405 A 12/2014

OTHER PUBLICATIONS

I. Kalkov et al., "Priority Inheritance during Remote Procedure Calls in Real-Time Android using Extended Binder Framework", JTRES '15 Proceedings of the 13th International Workshop on Java Technologies for Real-time and Embedded Systems, Article No. 5, Oct. 7-8, 2015, AMC, pp. 1-10.

*Primary Examiner* — Backhean Tiv
*Assistant Examiner* — Linh T. Nguyen
(74) *Attorney, Agent, or Firm* — Kunzler Bean & Adamson

(57) ABSTRACT

Apparatuses, methods, and computer program products are provided for receiving a remote procedure call (RPC) processing request having a priority value from a client device and processing tasks from multiple clients according to the priority values. In certain embodiments, the apparatuses, methods, and computer program products receive a remote request, compare the priority value of the received RPC processing request with priority values of pending RPC processing requests, and assign the received RPC processing request to a queue of a plurality of queues in response to the comparing.

9 Claims, 6 Drawing Sheets

(58) Field of Classification Search
CPC ...... G06F 9/4881; G06F 9/3009; G06F 3/061;
G06F 9/5083; G06F 11/0709; H04M
3/523
See application file for complete search history.

(56) References Cited

U.S. PATENT DOCUMENTS

| | | | | |
|---|---|---|---|---|
| 5,946,498 | A * | 8/1999 | Chiang | G06F 9/547 709/207 |
| 6,421,701 | B1 * | 7/2002 | Elnozahy | G06F 9/547 718/100 |
| 7,051,330 | B1 * | 5/2006 | Kaier | G06F 9/4843 709/203 |
| 8,856,400 | B1 * | 10/2014 | Davidson | G06F 13/38 710/34 |
| 9,514,170 | B1 * | 12/2016 | Tillotson | G06F 9/546 |
| 2001/0011296 | A1 * | 8/2001 | Chidambaran | H04L 29/06 709/203 |
| 2003/0037117 | A1 * | 2/2003 | Tabuchi | G06F 9/4843 709/207 |
| 2004/0230675 | A1 * | 11/2004 | Freimuth | H04L 29/06 709/223 |
| 2005/0223114 | A1 * | 10/2005 | Hanson | H04L 41/0893 709/245 |
| 2006/0031837 | A1 * | 2/2006 | Theurer | G06F 9/524 718/100 |
| 2006/0136574 | A1 * | 6/2006 | Anand | H04L 67/322 709/219 |
| 2006/0268871 | A1 * | 11/2006 | Van Zijst | H04L 29/12801 370/390 |
| 2007/0297404 | A1 * | 12/2007 | Boucard | H04L 47/15 370/389 |
| 2014/0162706 | A1 * | 6/2014 | De Wit | H04W 68/02 455/458 |
| 2016/0357702 | A1 | 12/2016 | Shamis et al. | |
| 2017/0034310 | A1 | 2/2017 | Victorelli | |
| 2018/0270149 | A1 * | 9/2018 | Jiao | H04L 29/08 |
| 2020/0042236 | A1 * | 2/2020 | Subraya | G06F 3/061 |
| 2020/0042349 | A1 * | 2/2020 | Jain | G06F 9/546 |

* cited by examiner

APPLICATION DATA ACCESS PRIORITY FOR REMOTE STORAGE SYSTEMS

FIELD

The subject matter disclosed herein relates to handling of remote procedure calls issued from a client device to a server device, and more particularly relate to maintaining a client device task priority on the server device.

BACKGROUND

Computing systems are capable of running multiple processes/threads (i.e., tasks). A scheduler schedules these tasks for execution by a processor. Multiple known algorithms are used for scheduling the tasks. The scheduler calculates a priority for every task, and often will update the calculated priorities. Often times the scheduler calculates a priority for a task that is intended for execution upon a remote computing system. The remote computing system is also available for processing requests to any number of other computing systems. Unfortunately, the remote computing system is unaware of the calculated priorities, and the scheduler of the remote computing system often schedules low priority tasks of a first computing system before high priority tasks of a second computing system.

BRIEF SUMMARY

A method for receiving remote processing requests having a priority value from a client device and processing tasks from multiple client devices according to the priority values is disclosed. An apparatus and computer program product also perform the functions of the method. A method, in one embodiment, includes receiving a remote request, comparing the priority value of the received RPC processing request with priority values of pending RPC processing requests, and assigning the received RPC processing request to a queue of a plurality of queues in response to the comparing.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
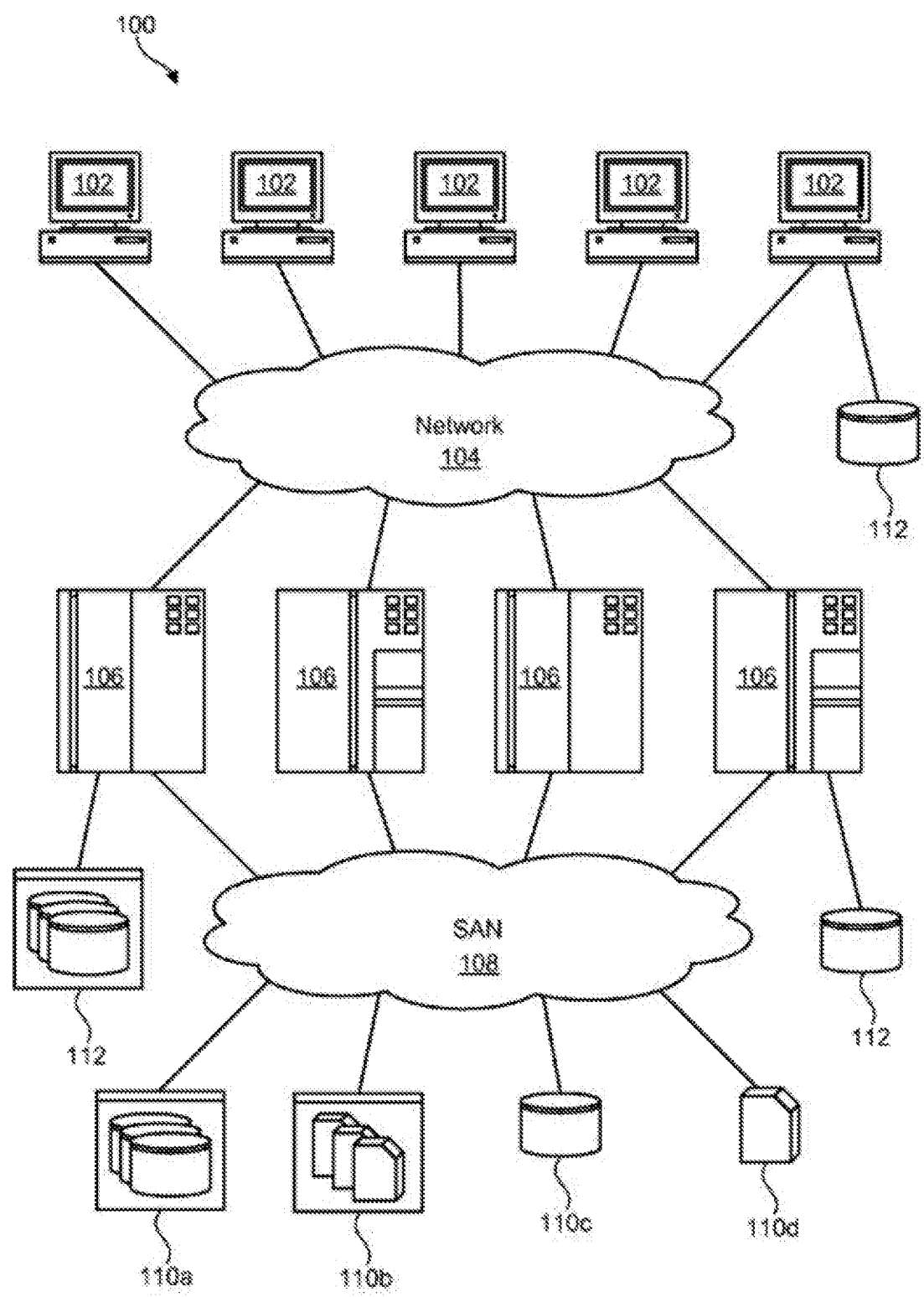
FIG. 1 is a schematic block diagram illustrating one example of a network architecture in accordance with the disclosed embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 is a schematic block diagram illustrating one example of a network architecture 100 in accordance with the disclosed embodiments. The network architecture 100 is presented to show one example of an environment where systems and methods in accordance with the disclosure may be implemented. The network architecture 100 is presented only by way of example and not limitation. Indeed, the systems and methods disclosed herein may be applicable to a wide variety of network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 102 may communicate over physical connections from one or more ports on the host 102 to one of the servers 106, which in turn access one or more ports on the storage system 110. In certain embodiments, the storage system 110 functions as a server, and accordingly, a server 106 that makes requests of the storage system 110 is functioning in a manner to a host 102, as described above, by making a request. A connection may be through a switch, fabric, direct connection, or the like. In certain embodiments, the servers 106 and storage systems 110 may communicate using a networking standard such as Fibre Channel (FC).

Figure 2:
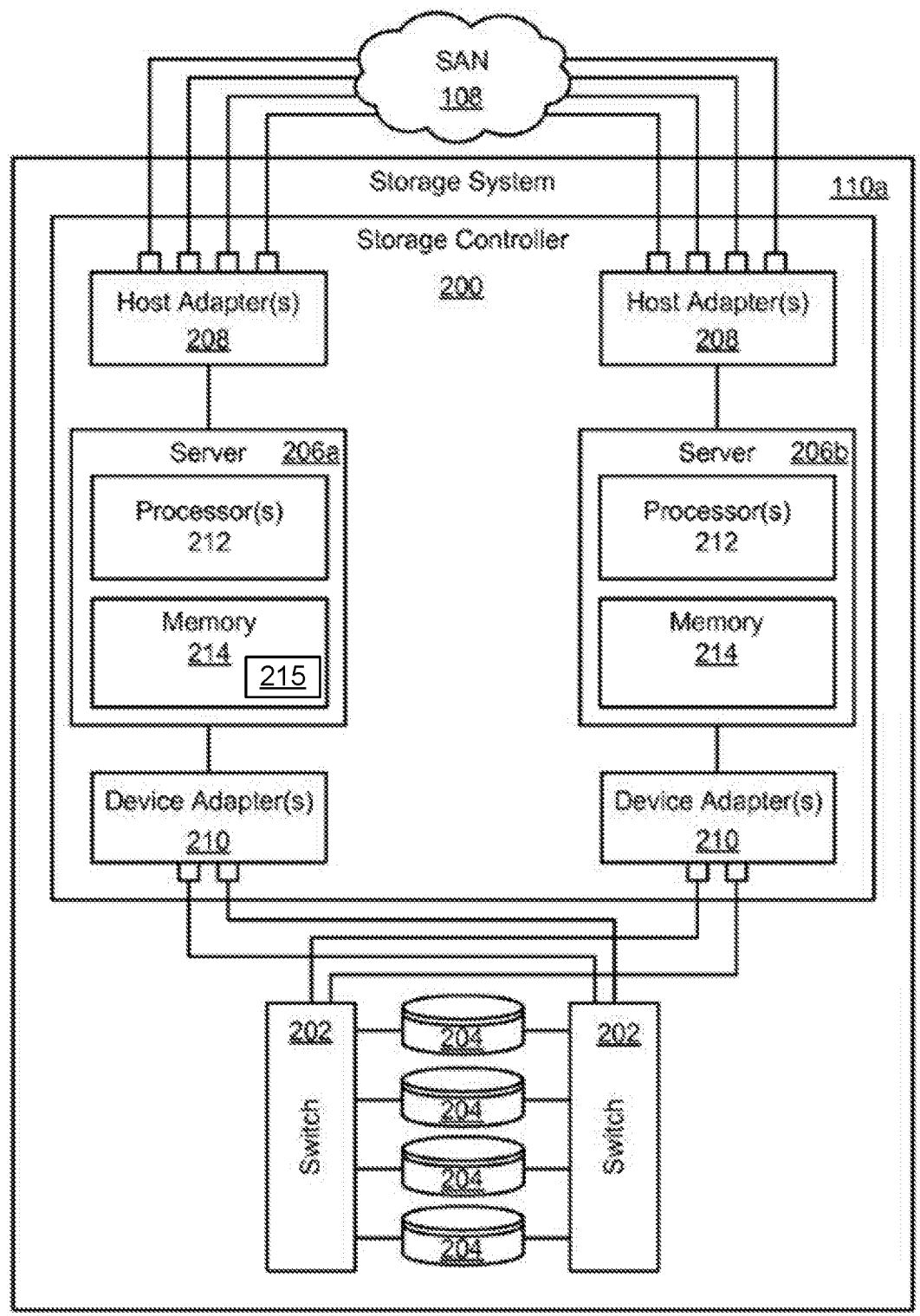
FIG. 2 is a schematic block diagram illustrating one embodiment of a storage system containing an array of hard-disk drives and/or solid-state drives in accordance with embodiments of the present disclosure.

FIG. 2 is a schematic block diagram illustrating one embodiment of a storage system 110a containing an array of hard-disk drives 204 and/or solid-state drives 204 in accordance with embodiments of the present disclosure. As shown, the storage system 110a includes a storage controller 200, one or more switches 202, and one or more storage devices 204, such as hard disk drives 204 or solid-state drives 204 (such as flash-memory-based drives 204). The storage controller 200 may enable one or more hosts 102 or servers 106 (e.g., open system and/or mainframe servers 106 running operating systems such as MVS, z/OS, or the like) to access data in the one or more storage devices 204.

In certain embodiments, the storage controller 200 includes one or more servers 206a, b. The storage controller 200 may also include host adapters 208 and device adapters 210 to connect the storage controller 200 to host devices 102 and storage devices 204, respectively. Multiple servers 206a, 206b may provide redundancy to ensure that data is always available to connected hosts 102. Thus, when one server 206a fails, the other server 206b may pick up the I/O load of the failed server 206a to ensure that I/O is able to continue between the hosts 106 and the storage devices 204.

In selected embodiments, each server 206a, b may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206a, b may host at least one instance of these software modules. These software modules may manage all read and write requests to logical volumes in the storage devices 204. Likewise, each host or client device may include volatile memory, non-volatile memory, and a processor.

In selected embodiments, the storage controller 200 includes a priority manager 215 that is adapted to manage processing tasks received from client devices. Servers 206a, b are capable of processing multiple processes/threads (i.e., tasks) from these client devices and then conveying back the results to the client devices. The priority manager 215 schedules these tasks for execution such that each task is eventually assigned processor time for its execution. One communication mechanism used to convey the task request/result cycle is Remote Procedure Call (RPC). Many Network File Systems (NFS) use RPC based communications. A client device will make an RPC request to the server 206a,b to access a storage device (e.g., storage device 204) on behalf of all processes running on the client device that require access to, for example, an NFS mounted file system space.

Beneficially, the priority manager 215 improves priority-based task processing. Some mission-critical tasks, prior to the priority manager, may have been placed at the bottom of a processing queue. Instead, the priority manager 215 enables the efficient processing of high-priority tasks over other RPC requests that may have a lower priority. Although the below described embodiments are explained with reference to RPC requests, the methods and systems may be adapted to other client/server relationships that would benefit from task prioritization of remotely received tasks.

Figure 3:
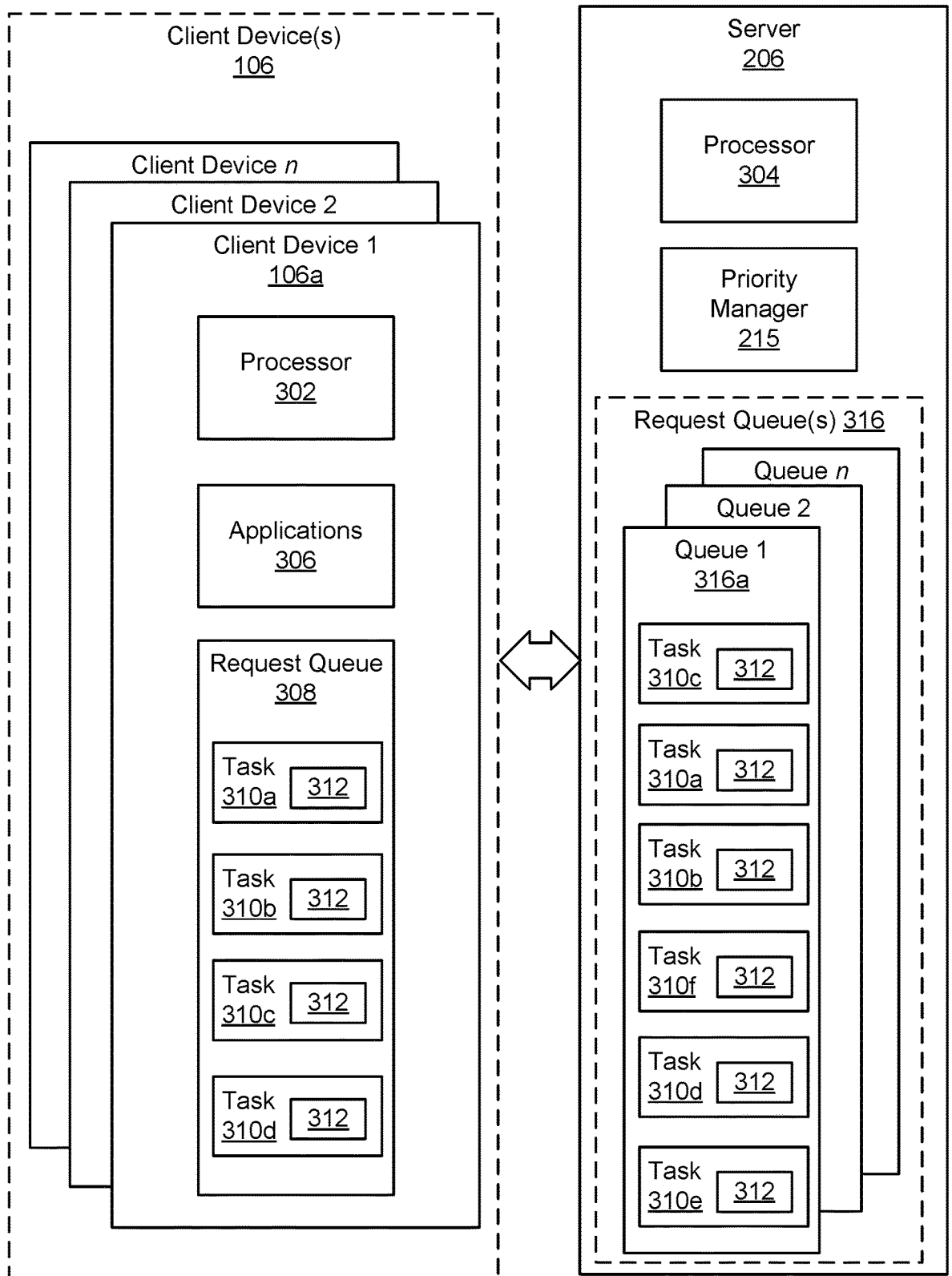
FIG. 3 is a schematic block diagram illustrating one embodiment of a client device communicating with a server in accordance with embodiments of the disclosure.

FIG. 3 is a schematic block diagram illustrating one embodiment of a client device 106 communicating with a server 206 in accordance with embodiments of the disclosure. As described above, both the client device 106 and the server 206 include, for example, processors 302, 304, memory, communication devices, etc. For clarity, many of these components are not depicted in FIG. 3.

As discussed above, the server 206 is configured to communicate with multiple client devices 106, depicted here as client device 1 106a, client device 2, and client device n, where n is any reasonable number of client devices. Each of the client devices 106 is configured to execute one or more applications 306. Each of these applications 306 may need to request a task be performed by the server 206. One example of a request to be performed remotely by the server 206 is a read or write request to a remotely mounted file system. The request to perform the task may be made by way of an RPC request, as described above.

Each client device 106 may maintain its own request queue 308. The client request queue 308 maintains a list of tasks (referred to collectively as tasks 310, and individually as task 310a, task 310b, etc.). In traditional computing systems (e.g., UNIX-based systems), each task 310 may be assigned a priority 312. One example of a priority is known as a "nice value." Unlike previous systems, the client device 106 and the server 206 of the present disclosure are configured to communicate the nice value, or priority value, as part of the request to perform a remote task. In the example of an RPC request, the client device modifies an RPC request to include a priority or nice value.

For example, the RPC body arguments may be modified by the client device 106 as follows:

```
struct call_body {
    unsigned int rpcvers;
    unsigned int prog;
    unsigned int vers;
    unsigned int nice;
    unsigned int proc;
    opaque auth cred;
    opaque auth verf;
    /* procedure specific parameters start here */
};
``` where "unsigned int nice" represents one method of implementing the conveyance of a priority value from the client device 106 to the server 206 in an RPC request.

The priority manager 215 is configured to receive an RPC request from a client device 106 and parse the request to identify the priority value 312 of the request. In certain embodiments, the priority manager 215 is configured to identify the nice value in the RPC body. The priority manager 215 is further configured to maintain at least one priority queue 316 (priority queues may be referred to collectively as "priority queues 316," or individually as priority queue 316a, priority queue 316b, etc.). In one embodiment, the priority manager 215 maintains a single priority queue 316 and inserts new RPC requests into the single priority queue 316 according to the priority value of the request. In alternative embodiments, the priority manager 215 maintains multiple request queues 316. For example, the priority manager 215 may be configured to maintain a high-priority queue (e.g., Queue 1), a medium-priority queue (e.g., Queue 2), and a low-priority queue (e.g., Queue 3). Any reasonable number of priority queues may be maintained by the priority manager 215.

The priority manager 215 may also maintain upper and lower threshold values for each of the high-, medium-, and low-priority queues 316 to help in the sorting of the incoming RPC requests. For example, if the range of possible priority values is between −20 and 19, with −20 being the highest priority and 19 being the lowest, then nice values between −20 and −5 may be assigned to the high-priority queue, nice values between −4 and 8 may be assigned to the medium-priority queue, and nice values between 9 and 19 may be assigned to the low-priority queue. Of course, the priority manager 215 may be configured to modify the upper and lower threshold value for each queue.

In certain embodiments, the priority manager 215 is configured to maintain priority queues that contain the tasks of multiple client devices. In other embodiments, the priority manager 215 is configured to maintain at least one priority queue for each identified client device 106. Further, the priority manager 215 may be configured to maintain a plurality of priority queues for each client device. In other words, the priority manager 215 may maintain a high-, medium-, and low-priority queue for each client device. Thus, when an RPC request is received, the priority manager 215 identifies the requesting client device 106, identifies the plurality of priority queues that correspond to that requesting client device 106, and inserts the RPC request into the priority queue accordingly.

In this example, the priority manager 215 may be configured to process tasks in the high-priority queues of each client device before proceeding to process tasks in the medium- or low-priority queues. In a further embodiment, the priority manager 215 may maintain a list of client device priority. For example, if certain client devices 106 are mission critical, the RPC requests from these client devices 106 may be prioritized over high-priority requests of other client devices 106.

Figure 4:
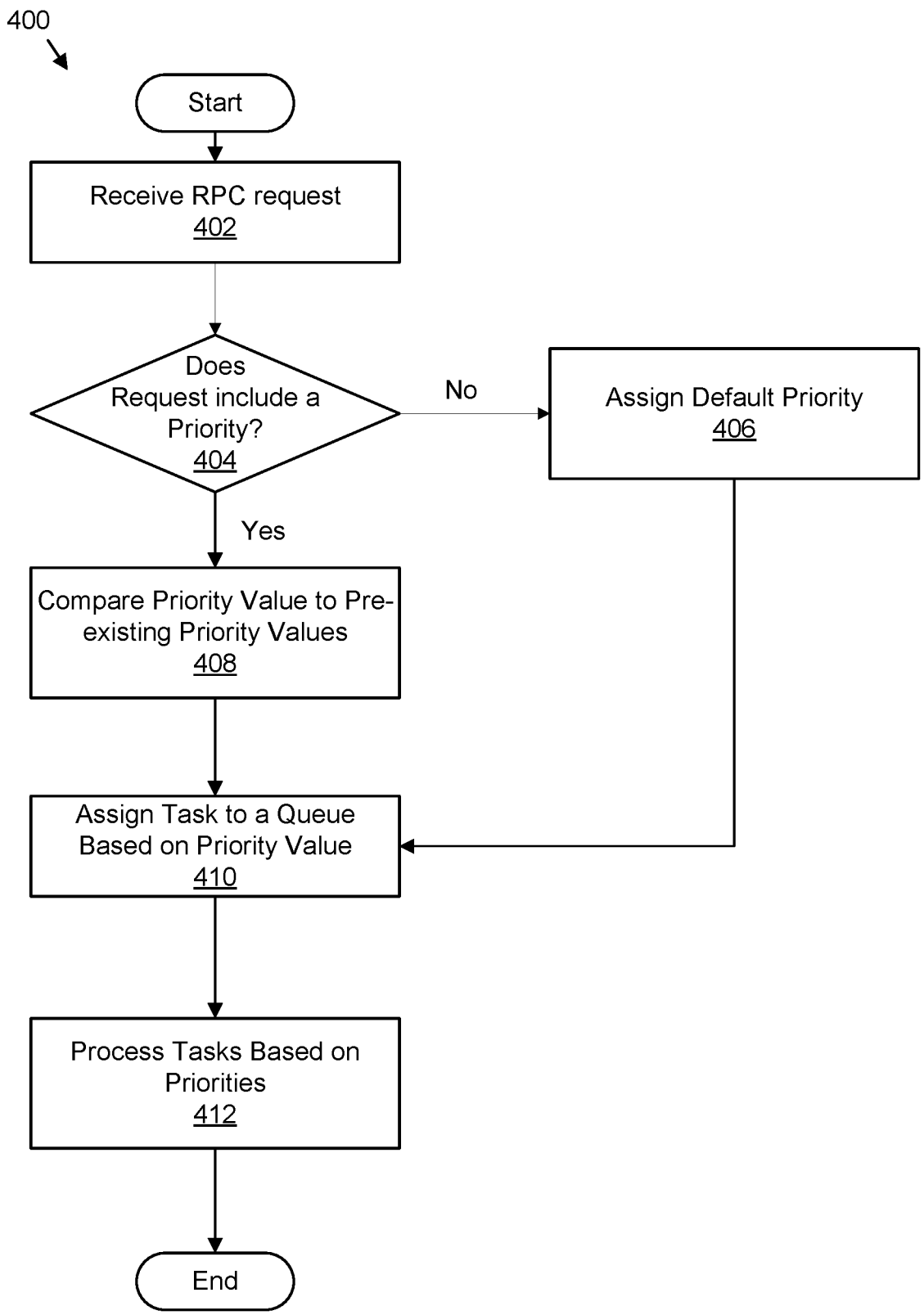
FIG. 4 is a flowchart diagram illustrating one embodiment of a method for prioritizing RPC requests in accordance with embodiments of the present disclosure.

FIG. 4 is a flowchart diagram illustrating one embodiment of a method 400 for prioritizing RPC requests in accordance with embodiments of the present disclosure. The method 400 may be performed by processing logic that may comprise hardware (e.g., circuitry, dedicated logic, programmable logic, microcode, etc.), software (such as instructions run on a processing device), firmware, or a combination thereof. In one embodiment, the method 400 is performed by the priority manager 215 of FIGS. 2-3.

The method 400 starts and the processing logic, at block 402 receives a processing request. In certain embodiments, the processing request is an RPC request, or a request made by some other protocol. The processing logic, at decision block 404, determines if the processing request contains a priority value. In certain embodiments, the processing request may contain a priority value, such as the nice value described above. If the processing logic determines that the request does not contain a priority value, at block 406, the processing logic assigns a default priority value to the processing request.

Alternatively, if the processing logic determines, at decision block 404, that the processing request does include a priority value, the processing logic compares, at block 408, the priority value of the processing request with priority values of pending processing requests. At block 410, the processing logic assigns the processing request (i.e., task) to one of the available priority queues based on the priority value. As described above, the priority queues may include a high-, medium-, and low-priority queue. The processing logic may assign the processing request to one of those three queues based on the priority value. At block 412, the processing logic continues to process requests/tasks based on priority values. Although depicted here near the end of the method, the processing logic may perform task processing of block 412 in parallel (i.e., simultaneously) with the steps of the other blocks described above.

In certain embodiments, the processing logic, at block 412, processes requests/tasks from the high-priority queue first before proceeding to handle the tasks in the medium- and low-priority queues. Although the example of high-, medium-, and low-priority queues is given, any reasonable number of queues is contemplated. The method 400 then ends.

Figure 5:
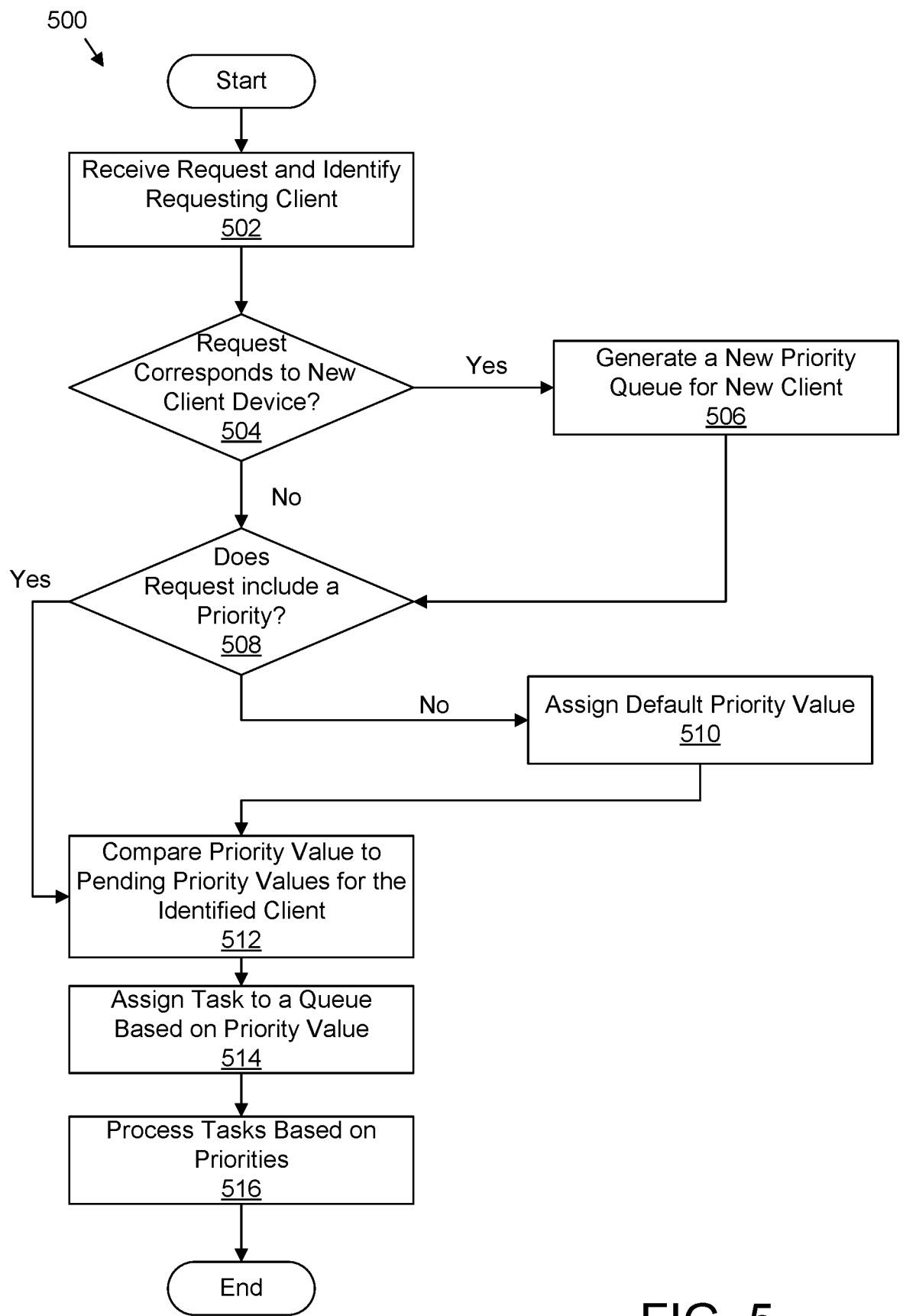
FIG. 5 is a flowchart diagram illustrating another embodiment of a method for prioritizing RPC requests in accordance with embodiments of the present disclosure.

FIG. 5 is a flowchart diagram illustrating another embodiment of a method 500 for prioritizing RPC requests in accordance with embodiments of the present disclosure. The method 500 may be performed by processing logic that may comprise hardware (e.g., circuitry, dedicated logic, programmable logic, microcode, etc.), software (such as instructions run on a processing device), firmware, or a combination thereof. In one embodiment, the method 500 is performed by the priority manager 215 of FIGS. 2-3.

The method 500 starts and the processing logic, at block 502, receives a request and identifies the requesting client device. The processing logic may maintain a list of all client devices that have pending processing requests. Additionally, the processing logic may maintain a list of all client devices that have previously requested processing tasks, for example, in the last 7 days.

At decision block 504, the processing logic determines if the processing request corresponds to a new client device, or to a client device that has existing/pending processing tasks. If yes, the processing logic, at block 506, generates a new priority queue for the new client. In certain embodiments, the processing logic generates a high-, medium-, and low-priority queue for the new client. In alternative embodiments, the processing logic generates any reasonable number of priority queues for each new client device.

At decision block 508, the processing logic determines if the processing request includes a priority. If the determination is no, the processing logic, at block 510, assigns a default priority. If the determination is yes, or after block 510, the processing logic, at block 512, compares the priority value of the new processing request to the priority values in the priority queues that correspond to the identified client device.

At block 514, the processing logic assigns the received processing request to one of the priority queues based on the priority value. At block 516, the processing logic continues to process tasks from the priority queues based on the priorities. For example, and as described previously, the processing logic may process all tasks in a high-priority queue before proceeding to process tasks in a medium- or low-priority queue. Further, the processing logic may process all tasks in the high-priority queues of each client device before proceeding to process any task in any medium- or low-priority queue. The method 500 then ends.

Figure 6:
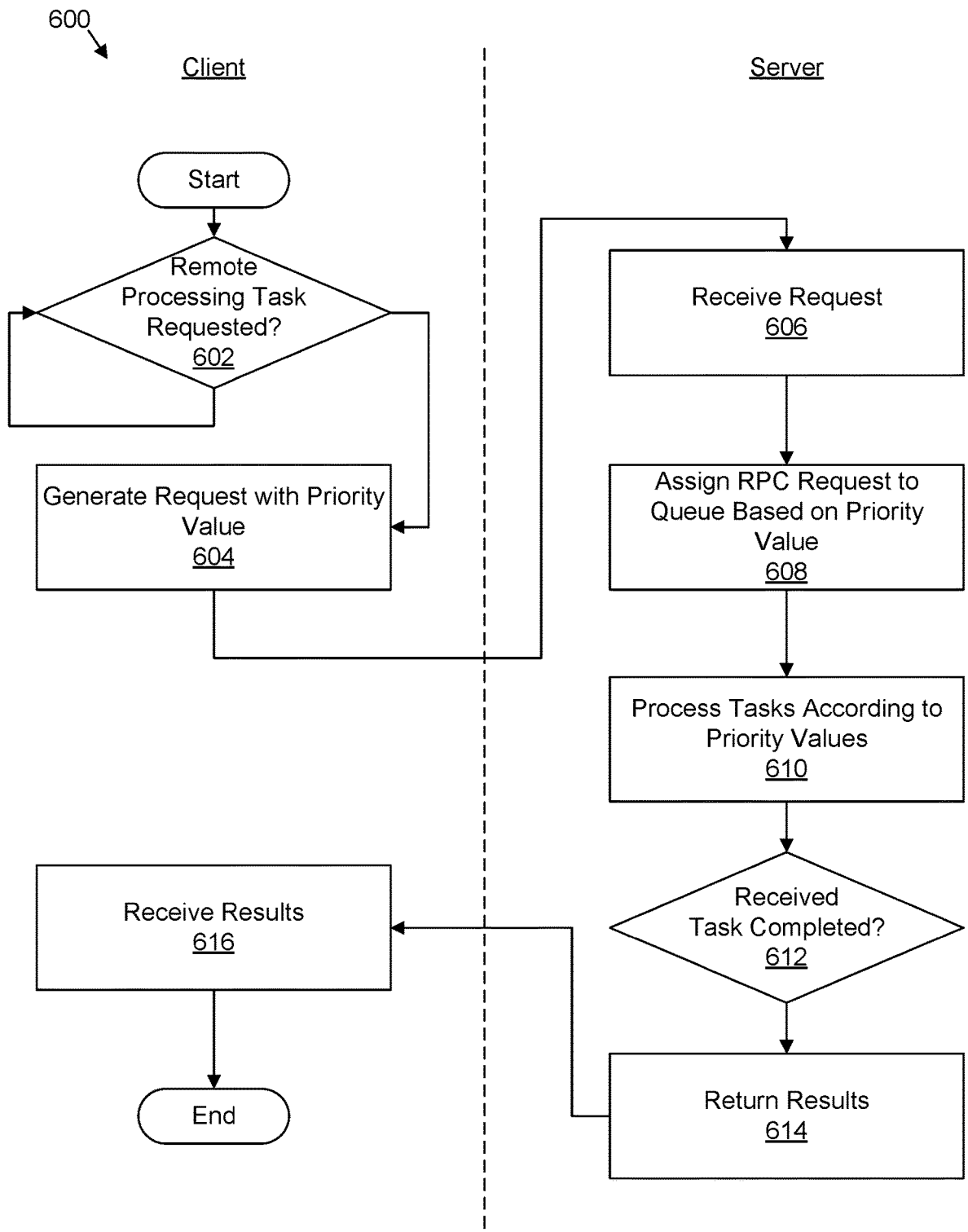
FIG. 6 is a flowchart diagram illustrating one embodiment of a method for sending a processing request, executing the request, and receiving the results of the request in accordance with embodiments of the disclosure.

FIG. 6 is a flowchart diagram illustrating one embodiment of a method 600 for sending a processing request, executing the request, and receiving the results of the request in accordance with embodiments of the disclosure. The method 600 may be performed by processing logic that may comprise hardware (e.g., circuitry, dedicated logic, programmable logic, microcode, etc.), software (such as instructions run on a processing device), firmware, or a combination thereof. In one embodiment, the method 400 is performed by the priority manager 215 of FIGS. 2-3.

The method 600 starts and the client device, at decision block 602, determines if a processing task has been requested. For example, one of many applications executing on the client device may, from time-to-time, request a processing task to be executed remotely on a mounted network file share. The client device, at block 604, generates and sends a processing request and includes a priority value. The client device, in certain embodiments, may modify the body of an RPC request to include a nice value.

The processing logic, at block 606, receives the processing request and parses the request to identify the priority value. At block 608, the processing logic assigns the processing request to a priority queue based on the priority value. The processing logic may assign the processing request to a common priority queue for all client devices, or alternative may assign the processing request to a priority queue that is unique to a specific client device.

At block 610, the processing logic processes tasks from the priority queues according to the priority values. Once the received processing request has been executed, at decision block 612, the processing logic returns the results of the processing request at block 614. The client device, at block 616, receives the results and the method 600 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for maintaining a priority of a task, the method comprising:
   receiving, from a first client device, a first remote procedure call (RPC) processing request that was modified to by the first client device to include a priority value;
   comparing, by use of a processor, the priority value of the first RPC processing request with priority values of pending RPC processing requests that correspond to the first client device;
   assigning the first RPC processing request to a queue of a first plurality of queues that correspond to the first client device in response to the comparing, where the first plurality of queues comprise at least one high-priority queue, at least one medium-priority queue, and at least one low-priority queue;
   generating, in response to receiving, from a second client device, a second RPC processing request that was modified by the second client device to include a priority value, a second plurality of queues that correspond to the second client device; and
   assigning, based on the priority value of the second RPC processing request, the second RPC processing request to a queue of the second plurality of queues.

2. The method of claim 1, further comprising processing all pending RPC processing requests corresponding to the at least one high-priority queue before processing all pending RPC processing requests corresponding to either of the at least one medium-priority queue or the at least one low-priority queue.

3. The method of claim 1, further comprising, in response to receiving a new RPC processing request with no priority value, assigning a default priority value to the new RPC processing request.

4. An apparatus comprising:
   a processor;
   a computer-readable storage media storing code executable by the processor to perform the steps of:
   receiving, from a first client device, a first remote procedure call (RPC) processing request that was modified by the first client device to include a priority value;
   comparing the priority value of the first RPC processing request with priority values of pending RPC processing requests that correspond to the first client device;
   assigning the first RPC processing request to a queue of a first plurality of queues that correspond to the first client device in response to the comparing, where the first plurality of queues comprise at least one high-priority queue, at least one medium-priority queue, and at least one low-priority queue;
   generating, in response to receiving, from a second client device, a second RPC processing request that was modified by the second client device to include a priority value, a second plurality of queues that correspond to the second client device; and
   assigning, based on the priority value of the second RPC processing request, the second RPC processing request to a queue of the second plurality of queues.

5. The apparatus of claim 4, where the steps further comprise processing all pending RPC processing requests corresponding to the at least one high-priority queue before processing all pending RPC processing requests corresponding to either of the at least one medium-priority queue or the at least one low-priority queue.

6. The apparatus of claim 4, where the steps further comprise, in response to receiving a new RPC processing request with no priority value, assigning a default priority value to the new RPC processing request.

7. A computer program product comprising a computer-readable storage medium having program instructions embodied therewith, the program instructions readable/executable by a processor to cause the processor to perform the steps of:
receiving, from a first client device, a first remote procedure call (RPC) processing request that was modified by the first client device to include a priority value;
comparing the priority value of the first RPC processing request with priority values of pending RPC processing requests that correspond to the first client device;
assigning the first RPC processing request to a queue of a first plurality of queues that correspond to the first client device in response to the comparing, where the first plurality of queues comprise at least one high-priority queue, at least one medium-priority queue, and at least one low-priority queue;
generating, in response to receiving, from a second client device, a second RPC processing request that was modified by the second client device to include a priority value, a second plurality of queues that correspond to the second client device; and
assigning, based on the priority value of the second RPC processing request, the second RPC processing request to a queue of the second plurality of queues.

8. The computer program product of claim 7, where the steps further comprise processing all pending RPC processing requests corresponding to the at least one high-priority queue before processing all pending RPC processing requests corresponding to either of the at least one medium-priority queue or the at least one low-priority queue.

9. The computer program product of claim 7, where the steps further comprise, in response to receiving a new RPC processing request with no priority value, assigning a default priority value to the new RPC processing request.

* * * * *